United States Patent [19]

Waugh

[11] 4,358,483
[45] Nov. 9, 1982

[54] GLASS CONTAINER SELECTED BASE COATING PROCESS

[75] Inventor: Robert E. Waugh, Columbus, Ohio

[73] Assignee: The D. L. Auld Company, Columbus, Ohio

[21] Appl. No.: 331,048

[22] Filed: Dec. 16, 1981

[51] Int. Cl.³ .............................................. B05D 5/00
[52] U.S. Cl. ............................ 427/287; 215/DIG. 6; 427/389.7; 427/425
[58] Field of Search ............ 427/287, 425, 421, 389.7; 215/12 R, DIG. 6

[56] References Cited

U.S. PATENT DOCUMENTS

| | | | |
|---|---|---|---|
| 2,929,525 | 3/1960 | Glover et al. | 215/12 |
| 2,991,896 | 7/1961 | Glover et al. | 215/DIG. 6 |
| 3,953,626 | 4/1976 | Suzuki et al. | 427/346 |
| 4,069,934 | 1/1978 | Karabedian | 215/DIG. 6 |
| 4,092,953 | 6/1978 | Waugh | 427/55 |
| 4,163,814 | 8/1979 | Asai et al. | 427/425 |
| 4,207,356 | 6/1980 | Waugh | 118/642 |
| 4,225,638 | 9/1980 | Waugh | 427/331 |
| 4,315,573 | 2/1982 | Bradley et al. | 427/287 |

Primary Examiner—Michael R. Lusignan
Assistant Examiner—Janyce A. Bell
Attorney, Agent, or Firm—Biebel, French & Nauman

[57] ABSTRACT

A process for coating selected areas on the base of a glass container such as a soft drink bottle without coating the bearing surface which comprises providing a plurality of annular channels or a reservoir on the base of the container to be coated, mounting the container with the base directed upward with respect to the balance of the container, conveying the container to a plastic casting station comprising a nozzle means having a plurality of applicator tubes, the applicator tubes being aligned with the annular channels or the reservoir on the base of the container, dispensing predetermined amounts of uncured plastic from a plurality of applicator tubes and into the channels or reservoir such that the amounts meld and at least partially fill the channels or reservoir, curing the plastic, and conveying the containers from the casting station.

11 Claims, 6 Drawing Figures

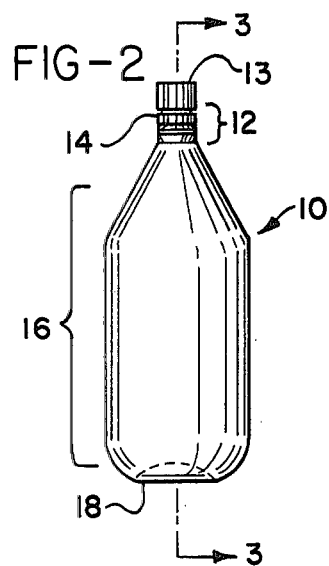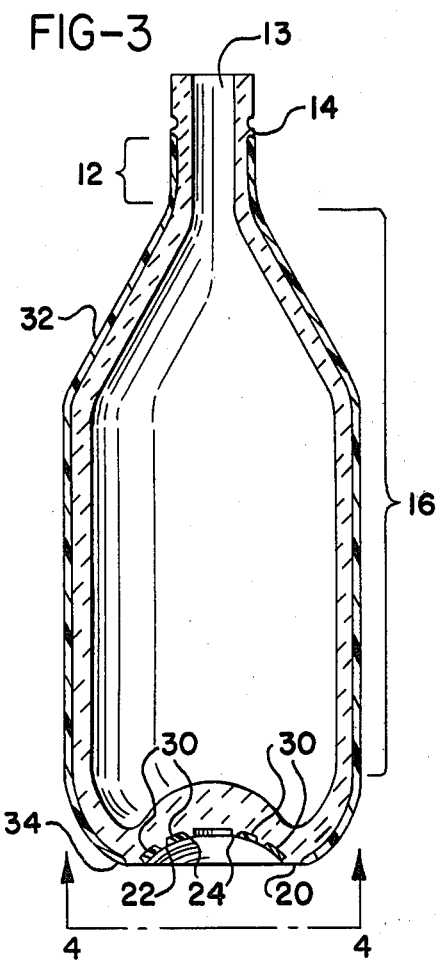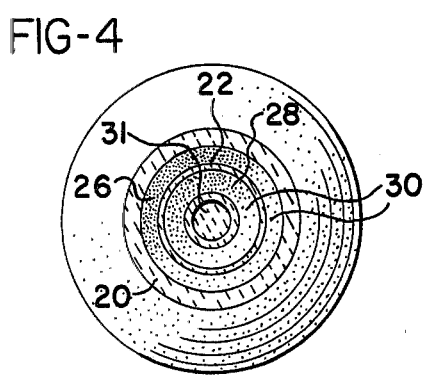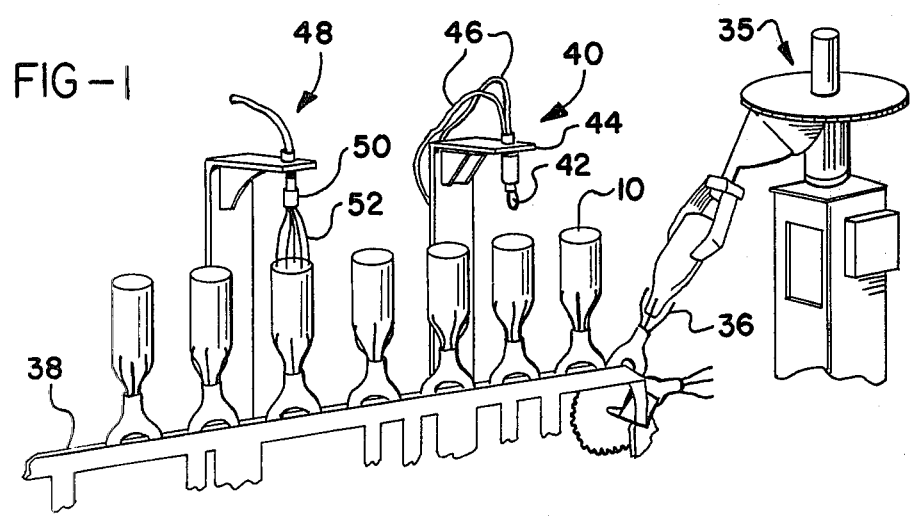

GLASS CONTAINER SELECTED BASE COATING PROCESS

BACKGROUND OF THE INVENTION

The present invention relates to a container coating process and more particularly to a process for coating the base of a bottle in selected areas to prevent shattering and fragment scatter.

Glass containers, such as glass bottles, have long been used as receptacles for soft drinks and various other commodities since they are superior in many respects to other types of containers. Glass containers can be formed in a wide variety of shapes and sizes. Additionally, glass containers are easily sanitized. The recent growth in interest in energy conservation and in resource conservation has increased the attractiveness of glass containers since these containers are easily cleaned and sterilized and are therefore easily reused. Glass containers are relatively sturdy and will hold up through a number of recyling operations although, after approximately 10 cycles, abrasion marks on the glass show and the glass looses its intrinsic strength.

One substantial drawback to the glass container is its tendency to shatter upon impact with a hard surface producing sharp glass shards. The safety risk involved with such breakage is heightened by the fact that many glass containers are pressurized (such as bottles containing carbonated beverages) and the shards which result from shattering the glass container will be scattered over a relatively large area. It has been determined that coating glass bottles with various plastic materials can significantly reduce shattering and reduce the scattering of glass shards. It has also been determined that a suitable coating properly applied to glass bottles will reduce the abrasion marks and reduce breakage during the filling and handling process, thereby increasing the number of times a glass container can be recycled. These techniques also permit a reduction in the amount of glass in the bottle and therefor lighter bottles.

Various techniques and materials have been developed, for coating glass containers such as glass bottles (see, for example, U.S. Pat. Nos. 4,092,953; 4,207,356 and 4,225,638). The base of the glass bottle presents an unusual coating problem. Normally, bottles containing carbonated beverages and the like are filled and shipped standing on their base. As a result, a typical soft drink bottle contains thicker glass in its base than in its side wall such that the base can withstand the frequent collisions which occur as the bottles are conveyed along a production line and when the bottles are loaded into shipment containers, shipped and stacked on the grocers shelf. At the same time, because the base of a typical glass bottle is thicker, the base does not shatter to the same extent when the bottle breaks but large pieces of glass blow out from the base of the bottle.

In some cases, it is possible to leave the base uncoated and rely upon the side coating to hinge the base pieces to the bottle sides when blow out occurs. This is particularly true since an overall base coating is less desirable than no coating at all. One means that has been used to bottom coat a bottle is to dip the base of the bottle into a bath of resin. This is undesirable, however, because the bearing surface is coated with resin and the coating, particularly on the bearing surface, is frequently marred, gouged, rubbed, and worn as the bottle rides on the base through cleaning, filling and shipping. This introduces lines of weakness in the coating on the bottle which leads to its easy rupture on being dropped. Furthermore, when the sides and base are coated with a continuous layer of plastic, the coating on the sides of the bottle may peel off if the coating is marred, worn or broken on the bearing surface. In particular, when the bottles are washed in caustic for reuse, the caustic will attack breaks in the coating at the bearing surface, leading to early coating failure.

Thus, there is a need for a coated base in which the bearing surface is not coated for use with larger bottles having large bases in which pieces of base glass are not hinged to the side coating when the bottle breaks and for use with lighter weight bottles which do not contain large volumes of glass in the base. There is also a need for a bottom coating process which is capable of coating only select areas of the base as required to prevent fragment scattering.

SUMMARY OF THE INVENTION

The present invention provides a process for coating the selected areas on the base of a glass container such as a soft drink bottle with a plastic material to prevent the base fragments from scattering upon breakage without coating the bearing surface. The process comprises:

(a) providing a plurality of annular channels or a reservoir on the base of the container to be coated, (b) mounting said container with said base upward with respect to the balance of said container, (c) conveying said container to a plastic coating station comprising a nozzle means including a plurality of applicator tubes, said applicator tubes being aligned with the annular channels or reservoir on the base of said container, (d) dispensing predetermined amounts of uncured plastic from a plurality of applicator tubes and into said channels or reservoir such that said amounts flow and meld and at least partially fill said channels or reservoir, (e) curing said plastic, and (d) conveying said bottles from said casting station.

The channels or reservoirs are defined on the container base by a system of ribs and/or the bearing surface which are longitudinal extensions of the base glass. The recesses are designed to receive a predetermined charge of plastic and confine it to selected areas of the base where reinforcement is required to prevent fragment scattering without coating the bearing surface which introduces lines of weakness in the base glass. The recesses on the base are dimensioned so that the desired reinforcement is obtained without the necessity of coating the entire base. The invention process thus has the advantage of the material savings which accompany coating selected areas of the base. Also since the bases of many container bottles are recessed, being drawn concavely inward, the invention process prevents the plastic from pooling at the center of the base and thereby ensures reinforcement of the entire base.

Likewise, one of the reservoir-forming or channel-forming ribs may be an annular plateau or bearing surface on which the bottle stands. This bearing surface is uncoated. As such, the plastic coating on the base and within the channels is not subject to being easily marred, gouged, rubbed and worn—the uncoated bearing surface bears the brunt of such wear and tear. No break points are therefore formed in the plastic coating in the base area, nor does marring the base coating affect the life of the side coating since the two are independent.

In one embodiment of the invention the containers are primed before they are coated with plastic. This is carried out by conveying the bottles to a priming station where the base is coated with a primer such as silane to improve the adhesion of the cast plastic for the glass container base. The primer may be applied by brushing, spraying, flow coating, etc., but is preferably spray coated. Alternatively, priming may be conducted at a preliminary stage, e.g., as part of a bottle coating process in which the base and sides of the bottle are primed at one time prior to coating either with resin.

A preferred practice is to fill the channels in the base of the bottle with an uncured polyurethane composition prepared by mixing "A" and "B" components such as a polyether polyol component ("A") and a diisocyanate component ("B"), among others. After coating the polyurethane is cured in the channels, for example, by heating.

BRIEF DESCRIPTION OF THE DRAWINGS

FIG. 1 is a schematic view illustrating one example of a production line for bottom coating the invention bottle;

FIG. 2 is a side elevation of a coated glass bottle in accordance with the present invention;

FIG. 3 is a section parallel the longitudinal axis of the bottle of FIG. 1;

FIG. 4 is a bottom view of the bottle of FIG. 1;

DETAILED DESCRIPTION OF THE INVENTION

Figure 5:
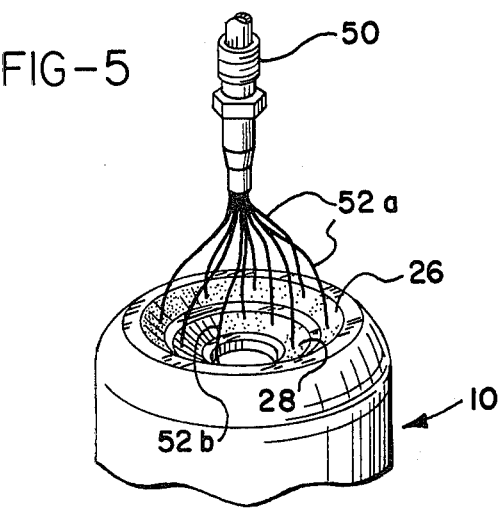
FIG. 5 is a schematic view of the nozzle means used in the bottom coating process shown in FIG. 4.

Bottom coating may be accomplished using a coating apparatus such as illustrated in FIG. 1. In the most typical case, the invention bottles will be bottom coated before or after having been side coated using processes such as disclosed in U.S. Pat. Nos. 4,092,953 and 4,225,638.

FIG. 1 illustrates the process of the present invention wherein bottles 10 are removed from a side coating line by an unloading means 35 and, in the process, inverted and placed on the bottom coating line wherein the bottles are primed and then coated.

A bottle having one base design used in conjunction with the present invention is shown in FIG. 2 where it is designated by the reference numeral 10. The bottle 10 comprises a neck portion 12 which terminates in a discharge opening 13. The upper extremities of the neck are contoured to accept a closing means such as a screw on or press fit bottle cap. The neck portion 12 of the bottle is also formed with an optional terminal ring 14 which is a radial extension encircling the neck. When present, the rib 14 stops the flow of plastic coated on the sides of the bottle and provides a termination line where the coating will not interfere with sealing the bottle cap and the cap will not damage the coating. Also the cast plastic film does not feather into an unsightly irregular line at the top. The terminal ring also results in a thicker coating at the film termination point and reduces the possibility of delamination and increases reinforcement. The cross section of the ring 14 is preferably a rounded rib having a height from the surface of the bottle of approximately 0.020 to 0.050 inch.

The mid portion 16 of the bottle flares outwardly from the neck portion 12 and may assume a variety of shapes and contours, for example, the bottle may be shaped according to a particular trade dress representing the origin of the bottle or its contents. The exterior surface of the mid portions of the bottle and the neck are coated with a layer of plastic 32 in the embodiment shown in FIGS. 2–4.

In the illustrated embodiment, the base 18 of the bottle 10 is drawn slightly inward along the longitudinal axis of the bottle as shown in FIG. 3. The thickness of the glass in the base 18 is typically greater than the thickness of the sides in the mid portion of the bottle.

The base 18 comprises an annular bearing surface 20 which extends outwardly from the base. The bottle is designed to stand on the bearing surface 20, the diameter of which is preferably the minimum diameter required to support the bottle stably. In the illustrated embodiment, inside the bearing surface 20 are two annular ribs 22 and 24 which form the annular channels 26 and 28 and a central reservoir 31 which characterize the present invention. Channels 26 and 28 and reservoir 31 (collectively referred to as "recesses") may be filled with cast plastic 30 in a manner described below. The base areas coated is a function of bottle design. Thus, channels 26 and 28 are optional, in some bottles a simple reservoir defined by the bearing surface is coated. Where the base 18 has an inward slope as illustrated in FIG. 2, the height of the ribs is tapered such that the channels step-wise follow the inwardly sloping contour of the base. Thus, in FIG. 3, rib 22 is slightly higher than rib 24. For a 1.5 liter capacity bottle, rib 22 is approximately 1/16" as measured from the base of the rib to its peak, and the rib 24 is approximately 1/32". For bottles having a capacity larger than approximately 2.0 liters, a third concentric channel is desirable.

On the bottom coating line, the bottles are held bottom up by means of neck holding chucks 36 which are advantageously mounted and interconnected by a conveying means such as a chain conveyor 38. Once on the line, the bottles 10 are conveyed to a primer station 40 where the bottles are sprayed with primer dispensed from a nozzle 42 mounted on an overhanging platform 44 supplied a primer composition through supply lines 46 which are pressurized. Heat may be applied to remove any solvent in the primer composition although if the bottle is pre-heated (e.g., as part of a coating, washing, or manufacturing process), the solvent will flash off automatically.

It is desirable to prime the glass bottle with a silane before coating. As an example, a mixture of approximately 2% castor oil and up to approximately 2% silane (Dow 6020, 6040 or 6075 from Dow Corning Corp.) which are respectively, 3-(2-aminoethylamine) propyltrimethoxysilane, glycidoxypropyltrimethoxysilane and vinyltriacetooxysilane) in a solvent (70% isopropyl alcohol and 30% acetone) may be used. Other known silane primers may also be used. As an alternative to spraying the primers may be applied by dipping or another coating process, followed by drying to remove the solvent. Alternatively the primer may be applied to the entire bottle as an initial step in a continuous bottle coating process.

The bottle may be coated with various plastics. A preferred coating, however, is a liquid polyurethane plastic of the type disclosed in U.S. Pat. No. 4,092,953, which is a mixture of "A" and "B" components. Basically that mixture is one of a polyether polyol component ("A") which may be difunctional, trifunctional and/or tetrafunctional polypropylene glycol containing a suitable catalyst and a diisocynate component ("B") such as an aliphatic diisocynate. An example of the diisocynate is Desmodur from Mobay Chemical Co. or IPDI from Chemische Werke, Huls, and the polyether polyol may be one or more of the Pluracol materials (P-410 or TP-440) from BASF Wyandotte. It may also be a polyether-polyester polyol combination. The ratio of components A:B is preferably 50–60:40–50. A polyester polyol or polylactone polyol may be used in place of the polyether polyol. The mixture of "A" and "B" components of this type cures through catalytic action, under heat, such as produced by infrared radiation. Although the aforementioned two component polyurethane is prefered, single component, photocurable, polyurethanes of known types can also be used. A two part epoxy may also be useful.

After priming, the bottles are moved to a base coating station 48 where in the illustrated embodiment the channels 26 and 28 on the base of the bottle are selectively coated with a liquid uncured plastic dispensed through nozzle means 50 which is provided with a plurality of applicator tubes 52. The areas of the bottle base coated in accordance with the invention vary with the bottle design, the objective in each case being to prevent fragment scattering from the base in the event of breakage. For example, in some cases the base may be formed with a simple reservoir as defined by the bearing surface 20, in which case the reservoir is selectively coated in the present invention without coating the bearing surface itself. Prior to plastic coating the bottles may be heated to 110°–130° F. to aid the flow of the coating onto the bottle. As shown more fully in FIG. 5, which illustrates a nozzle means for bottom coating a 1.5 liter soft drink bottle, the nozzle means 50 comprises a first set of applicator tubes 52a and a second set 52b. Sets 52a and 52b are each mounted in concentric circular patterns corresponding to the channels 26 and 28 to be coated. Each applicator tube delivers a quantity of plastic to the appropriate recess in the base of the bottle which is predetermined to meld with the quanta delivered from the other applicator tubes serving that recess and fill the channel without overfilling it. In the case of a bottom as in FIG. 4, because the outside channel 26 is larger and has a greater capacity for cast plastic then the inside channel 28, there are more tubes in the first set of applicator tubes 52a than the second set 52b. In this manner, more plastic is dispensed to the outer channel when a single pumping station casting machine is used. The machine and nozzles are designed to give a constant flow rate in grams per minutes per tube, the outer channel will receive more plastic than the inner channel for a given cast time. As an alternative to using more applicator tubes in set 52a than set 52b applicator tubes 52a and 52b may be supplied by two individually adjustable pumping stations that will allow the flow rate per pumping station to be adjusted so that set 52a delivers more plastic to the base of the bottle within the preset base coating time than set 52b delivers to the inner channel. The number of applicator tubes and the spacing between the tubes in an individual nozzle depends on the capacity of the bottle, and more directly, the size of the base. For example, in the case of casting a base as in FIG. 4, it has been found, however, that between 10 and 15 tubes spaced apart approximately $\frac{1}{2}$ to $\frac{3}{4}''$ may be used in the set serving the outer channel and 6 to 8 tubes spaced $\frac{1}{2}$ to $\frac{3}{4}''$ may be used in the set of applicator tubes servicing the inner channel in a 1.5 liter bottle. The tubes preferably have an inner diameter of approximately 0.033" and an outer diameter of approximately 0.050". Each set of tubes may be maintained in the circular orientation using a spacer bar, or as illustrated in FIG. 5, the tubes may be of a sturdy but flexible material which maintains its location relative to the base of the bottle under the pressure from the casting head. Preferably, the applicator tubes 52 of the nozzle means 50 are designed for each different type of bottle so the desired arrangement is fixed for the size of the base and the channel positions for the particular bottle design.

Figure 6:
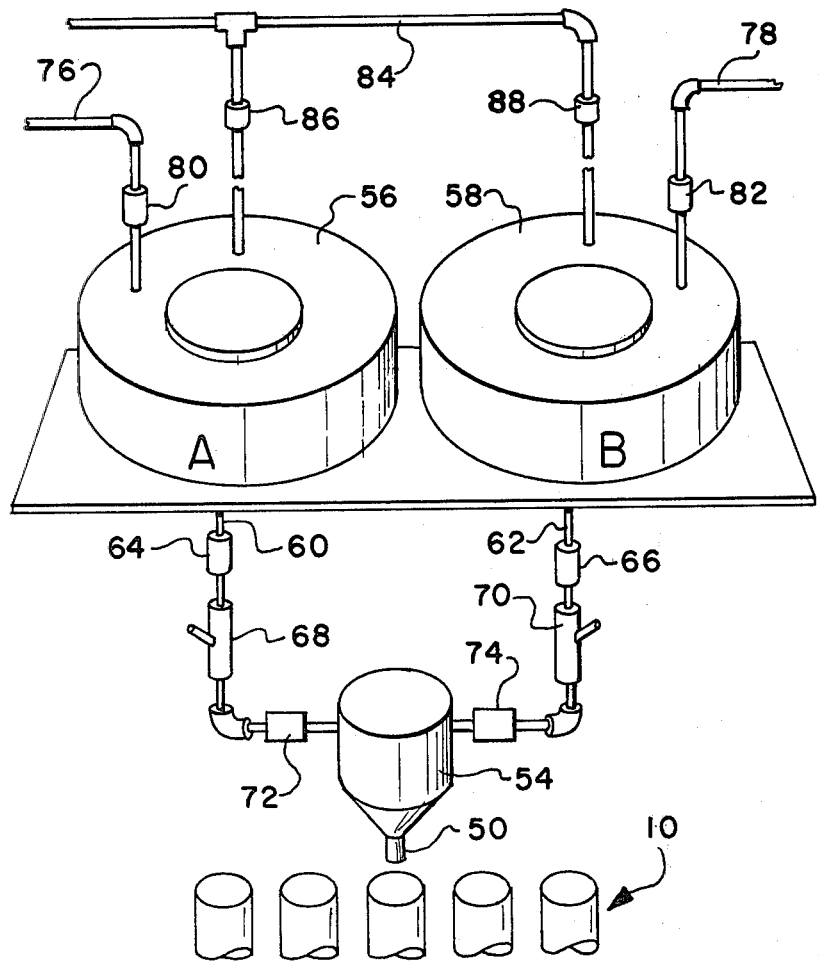
FIG. 6 is a schematic view of a mixing apparatus for use with the invention.

The invention is particularly advantageous because it permits coating a simple recessed base without having the coating pool in the center of the base. This is possible because the quantity of plastic delivered to any area of the base can be adjusted similar to as described above to prevent pooling. In a preferred embodiment the cast plastic is a mixture of components "A" and "B" as described below. These components may be supplied to the nozzle means 50 using a mixing apparatus as shown in FIG. 6. Casting head 54 has a nozzle means 50 which has a plurality of applicator tubes 52 (not shown in FIG. 6).

The "A" and "B" materials are supplied from tanks 56 and 58 which may be stirred for the purpose of degassing. The degassed material then flows down pipes 60 and 62 through ball valves 64 and 66 through filters 68 and 70 and metering devices 72 and 74 to the casting and mixing head 54, wherein the components are mixed. Located beneath the casting head 54 is the conveyor which carries the bottles 10 with which the casting head 54 is timed such that when a bottle 10 is under the casting head, a predetermined amount of plastic is cast and then the conveyor moves the next bottle into position.

Tanks 56 and 58 are supplied with the "A" and "B" components, respectively, through supply lines 76 and 78 equipped with ball valves 80 and 82. The tanks 56 and 58 may be pressurized using air or nitrogen which is supplied under pressure to the tanks through line 84 via ball valves 86 and 88 which prevent tanks 56 and 58 from losing pressure when line 84 is disconnected.

The width and depth of the channels as well as the number, depend on the size of the bottle and the amount of reinforcement which is desired. Since smaller bottles do not present the dangers which accompany the breakage of larger bottles, it will be apparent that the invention is particularly applicable to bottles having a capacity greater 0.5 liters and more so to 1.0 liter and greater capacity bottles. Using a 1.5 liter bottle as representative of the glass containers coated in accordance with the present invention, the bearing surface 20 is preferably approximately 3.0 inch in diameter and sits approximately 0.062 inch above the lower surface of the base. The outermost channel 26 which borders the bearing surface in FIG. 3 is preferably about 0.312 inch wide and has a diameter, as measured from the inner edge of the bearing surface of approximately 2.5 inch. The rib 22 between the channels 26 and 28 preferably has a triangular or truncated triangular cross section and terminates in 0.062 inch rounded peak. The inner channel 28 is preferably 0.287 inch wide and has a $1\frac{3}{8}$ inch diameter as measured from the outer edge of rib 24. The actual rib design must be determined for each different bottle design.

One bottle design used in conjunction with the present invention provides for a slightly thicker film at the bottom termination line 34 of the side coating 32 which provides additional reinforcement to the protruding side portions at the bottom of the bottle which are vulnerable to collision and breakage. This enhanced thickness is achieved by positioning the bearing surface 20 slightly inside the side wall of the bottle as shown.

Having described the invention in detail and by reference to specific embodiments thereof, it will be apparent that numerous variations and modifications are possible without departing from the invention as defined by the following claims.

What is claimed is:

1. A process for coating selected areas on the base of a glass container such as a soft drink bottle which comprises:
    (a) providing one or more annular channels or a reservoir on the base of the container to be coated,
    (b) mounting said container with said base directed upward with respect to the balance of said container,
    (c) conveying said container to a plastic casting station comprising a nozzle means having a plurality of applicator tubes, said applicator tubes being aligned with the annular channels or reservoir on the base of said container,
    (d) dispensing predetermined amounts of uncured plastic from a plurality of applicator tubes and into said channels or reservoir such that said amounts flow and meld and at least partially fill said channels or reservoir without coating said bearing surface,
    (e) curing said plastic, and
    (f) conveying said containers from said casting station.

2. The process of claim 1 wherein said base of said container is primed prior to dispensing said uncured plastic into said channels.

3. The process of claim 2 wherein said base is primed after said step (b) and before said step (c).

4. The process of claim 2 wherein said container is heated to a temperature of about 110° to 130° F. immediately prior to dispensing said uncured plastic into said channels.

5. The process of claim 4 wherein said base is formed with channels concentric about the center of said base comprising an outside channel, an inside channel.

6. The process of claim 5 wherein the plurality of applicator tubes comprises a first set of applicator tubes aligned with said outside channel and a second set of applicator tubes aligned with said inside channel and said dispensing is controlled such that said first and second set of applicator tubes substantially fill said outside and inside channels.

7. The process of claim 6 wherein said first set of applicator tubes outnumber said second set of applicator tubes.

8. The process of claim 7 wherein said base is drawn longitudinally inward such that said base is concave and said channels prevent said plastic from pooling at the center of said base.

9. The process of claim 1 wherein said container is a soft drink bottle.

10. The process of claim 1 wherein said plastic is an uncured polyurethane prepared by mixing a polyether-polyol component and a diisocyanate component.

11. The process of claim 1 wherein said base is formed with a center reservoir as defined by said bearing surface.

* * * * *